(12) United States Patent
Bandaram et al.

(10) Patent No.: US 8,302,154 B2
(45) Date of Patent: Oct. 30, 2012

(54) AUTOMATIC AND ADJUSTABLE SYSTEM AND METHOD FOR SYNCHRONIZING SECURITY MECHANISMS IN DATABASE DRIVERS WITH DATABASE SERVERS

(75) Inventors: Satheesh E. Bandaram, Fremont, CA (US); Huaxin Gao, San Jose, CA (US); Bilung Lee, Fremont, CA (US); Paul Ostler, Boise, ID (US)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 11/938,261

(22) Filed: Nov. 10, 2007

(65) Prior Publication Data

US 2010/0024038 A1    Jan. 28, 2010

(51) Int. Cl.
    *H04L 29/06* (2006.01)
(52) U.S. Cl. .............................. 726/2; 726/1; 713/168
(58) Field of Classification Search .................. 726/1–3; 707/781; 713/168
    See application file for complete search history.

(56) References Cited

U.S. PATENT DOCUMENTS

| | | | |
|---|---|---|---|
| 5,204,961 A | 4/1993 | Barlow | |
| 6,112,304 A | 8/2000 | Clawson | |
| 6,859,879 B2 | 2/2005 | Henn et al. | |
| 6,999,956 B2 | 2/2006 | Mullins | |
| 7,229,492 B2 | 6/2007 | Chatterji et al. | |
| 7,231,517 B1* | 6/2007 | Mashayekhi | 713/167 |
| 7,761,468 B2 | 7/2010 | Gao et al. | |
| 2002/0116457 A1 | 8/2002 | Eshleman et al. | |
| 2003/0097593 A1* | 5/2003 | Sawa et al. | 713/201 |
| 2003/0167456 A1 | 9/2003 | Sabharwal | |
| 2005/0108521 A1* | 5/2005 | Silhavy et al. | 713/156 |
| 2005/0198490 A1 | 9/2005 | Jaganathan et al. | |
| 2006/0112304 A1 | 5/2006 | Subramanian et al. | |
| 2006/0116991 A1 | 6/2006 | Calderwood et al. | |
| 2006/0294080 A1 | 12/2006 | Arnold et al. | |

FOREIGN PATENT DOCUMENTS

| | | |
|---|---|---|
| WO | WO 2005/067394 | 7/2005 |
| WO | WO 2005/067395 | 7/2005 |
| WO | WO2005067394 A2 * | 7/2005 |

* cited by examiner

*Primary Examiner* — Ali Abyaneh

(74) *Attorney, Agent, or Firm* — Cantor Colburn LLP; Elissa Wang

(57) ABSTRACT

A system and method for database security provides multiple choices of security mechanisms for enabling access to a database through a database driver. A security mechanism that is compatible with a database is selected and the security mechanisms between an application and a database server are automatically determined using the selected security mechanism.

20 Claims, 3 Drawing Sheets

AUTOMATIC AND ADJUSTABLE SYSTEM AND METHOD FOR SYNCHRONIZING SECURITY MECHANISMS IN DATABASE DRIVERS WITH DATABASE SERVERS

FIELD OF INVENTION

The present invention generally relates to computer implemented database management systems, and particularly to systems and methods for database server security mechanisms.

BACKGROUND

In client/server environments, database servers typically hold the database management system and the database. Access to the database is controlled by the database server. The database server may provide access to a client application through a database driver using a security mechanism. Many different security mechanisms are in use, including those using user IDs and passwords, encrypted passwords, Kerberos, and others. Database servers typically require a configuration setting that decides what security mechanisms are supported under that configuration setting. Because many security mechanisms are available for authentication of access to databases, the database driver often does not have knowledge of what the configuration setting is on a database server until a connection is made to the database server. In the process of making this connection, the database driver will request a security mechanism; however, it is very likely that the security mechanism requested will not be supported under the configuration setting on the database server.

When this situation occurs, the database driver will usually return an error to the application and the application will abort. An administration tool is then needed to find out which security mechanisms are supported by the database driver. The application may then be modified to accommodate the supported security mechanism. Use of this administrative tool is undesirable because it is inefficient and delays the authentication process. Some database drivers may provide a retry function using an alternative security mechanism when such an error occurs. However, these systems must limit themselves to a fixed initial security mechanism due to the complexity of retry algorithm to allow a plethora of initial security mechanisms. In other words, none of existing database drivers provide both multiple choices of initial security mechanisms and automatic synchronization of security mechanism with the database server.

Accordingly, there is a need for systems and methods for increasing the efficiency and speed of authentication of access to a database by an application. There is also a need for systems and methods for efficiently addressing the situation where a security mechanism requested by an application is not supported under the configuration setting on a database server.

SUMMARY OF THE INVENTION

To overcome the limitations in the prior art briefly described above, the present invention provides a method, computer program product, and system for automatically synchronizing security mechanisms between database servers and database drivers.

In one embodiment of the present invention a database security method comprises: providing multiple choices of security mechanisms for enabling access to a database through a database driver; selecting a security mechanism compatible with a database server; and automatically synchronizing security mechanisms between an application and a database server using the selected security mechanism.

In another embodiment of the present invention, a database security method comprises: constructing a priority list; storing a synchronization flag in an application, the flag instructing a database driver to synchronize a security mechanism with the database server or not; retrieving an initial security mechanism from an application; exchanging information between the database server and the database driver; requesting security data access to a database controlled by the database server; informing the database server of the initial security mechanism; determining if the database server supports the initial security mechanism; determining an alternative security mechanism; sending the synchronized security mechanism to the database server; conducting a security check; and connecting the database server to the application if the security check is passed.

In a further embodiment of the present invention a database driver comprises: a synchronization flag interface for storing and retrieving a synchronization flag; an initial security mechanism interface for storing and retrieving an initial security mechanism; a priority definition interface for defining priorities of security mechanisms; and a priority list containing the defined priorities of the security mechanisms.

In an additional embodiment of the present invention comprises an article of manufacture for use in a computer system tangibly embodying computer instructions executable by the computer system to perform process steps for synchronizing security mechanisms of database servers and database drivers, the process steps comprise: providing multiple choices of security mechanisms to provide access to a database through a database driver; selecting a security mechanism compatible with a database server; and automatically synchronizing security mechanisms between an application and a database server using the selected security mechanism.

Various advantages and features of novelty, which characterize the present invention, are pointed out with particularity in the claims annexed hereto and form a part hereof. However, for a better understanding of the invention and its advantages, reference should be make to the accompanying descriptive matter together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

The present invention overcomes the problems associated with the prior art by teaching a system, computer program product, and method for automatically synchronizing security mechanisms between database servers and database drivers. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The invention addresses problems which arise when an application requests database access and the security mechanism requested by the database driver is not supported by the configuration setting on the database server. The system and method of the invention provides both multiple choices of initial security mechanisms and automatic synchronization of security mechanism with a database server. Prior art database systems did not provide both multiple choices of initial security mechanisms and automatic synchronization of security mechanisms with the database server.

Embodiments of the present invention assign a priority to each security mechanism and provide a list of all security mechanisms based on their priorities. The priority list is defined globally across all configuration settings of the database servers and is applicable to any configuration setting. A default priority list is provided with priority assigned to each security mechanism. In some embodiments this priority is based on the security mechanism's secureness relative to other security mechanisms.

A priority definition interface enables assignment of priority to any user-defined security mechanism from an application. As a result, the complexity of retry algorithm is thus greatly reduced with proper utilization of the priority list. Also, an initial security mechanism defines a preferred security mechanism from an application. As a result, applications that would otherwise fail due to inconsistent security mechanisms will be able to automatically choose from a plethora of initial security mechanisms and to synchronize the security mechanism with a database server through a database driver.

Figure 1:
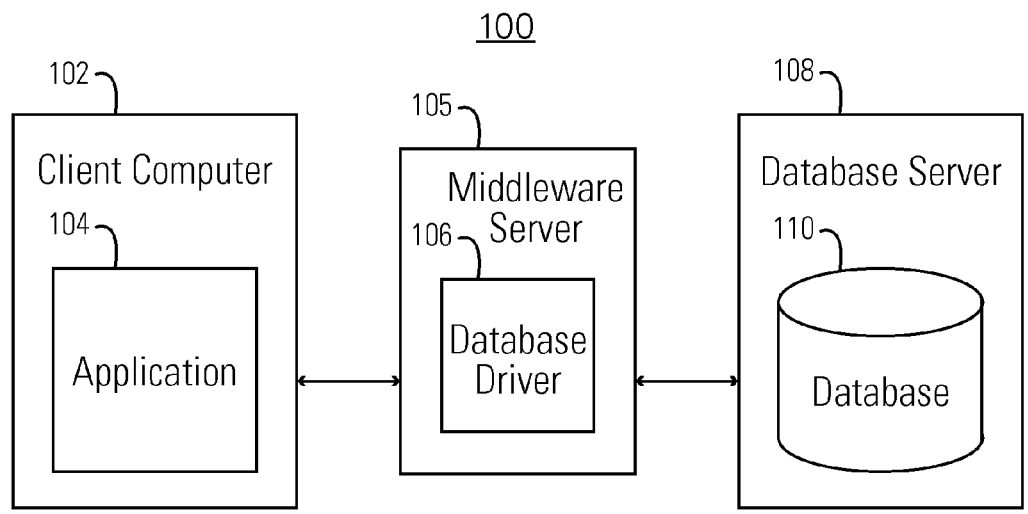
FIG. 1 shows a block diagram of a database system in accordance with one embodiment of the invention.

FIG. 1 shows a block diagram of a database system 100 in accordance with one embodiment of the invention. A client computer 102 includes an application program 104 and is coupled to a database driver 106 that may reside in a middleware server 105. It will be appreciated by those skilled in the art that many different configurations of the database system 100 are possible, for example, the database driver may reside in the client computer 102, or in the database server 108. The database driver is coupled to a database server 108, which includes a database 110, as well as other components such as a database management system (not shown).

Figure 2:
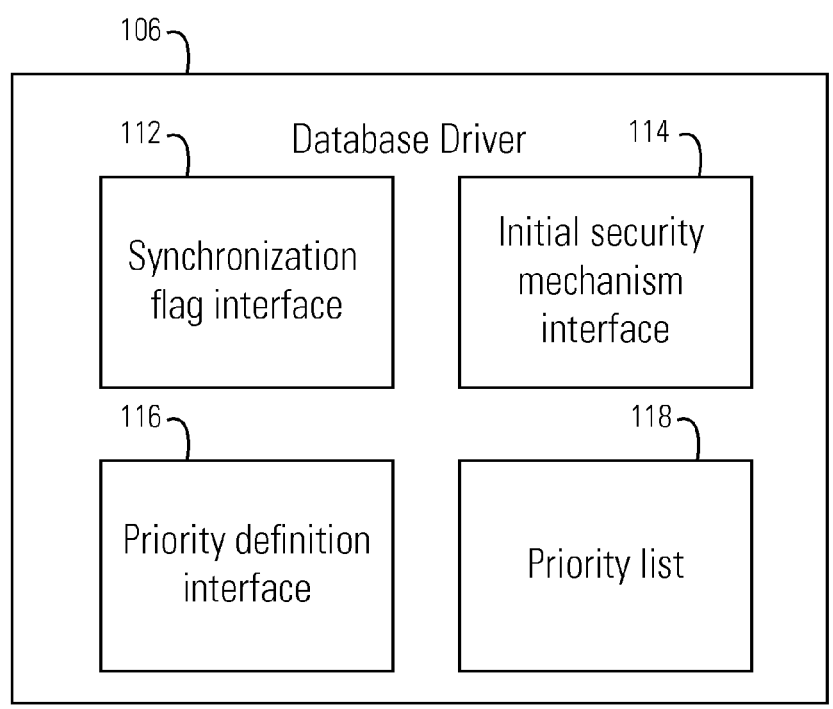
FIG. 2 shows a block diagram of a database driver used in the database system shown in FIG. 1.

FIG. 2 shows additional details of the database driver 106 shown in FIG. 1. A synchronization flag and corresponding interface 112 stores and retrieves a synchronization flag, which is generated by the application 104. The synchronization flag and corresponding interface 112 also instructs the database driver 106 whether to synchronize the security mechanism with the database server 108, or not.

An initial security mechanism interface 114 provides storage and retrieval of initial security mechanism accessible from the application. A priority definition interface 116 enables the application 104 to assign priority to any user-defined security mechanism. A priority list 118 assigns priority assigned to each security mechanism based on its secureness relative to the others. In other embodiments other priorities may be used.

Figure 3:
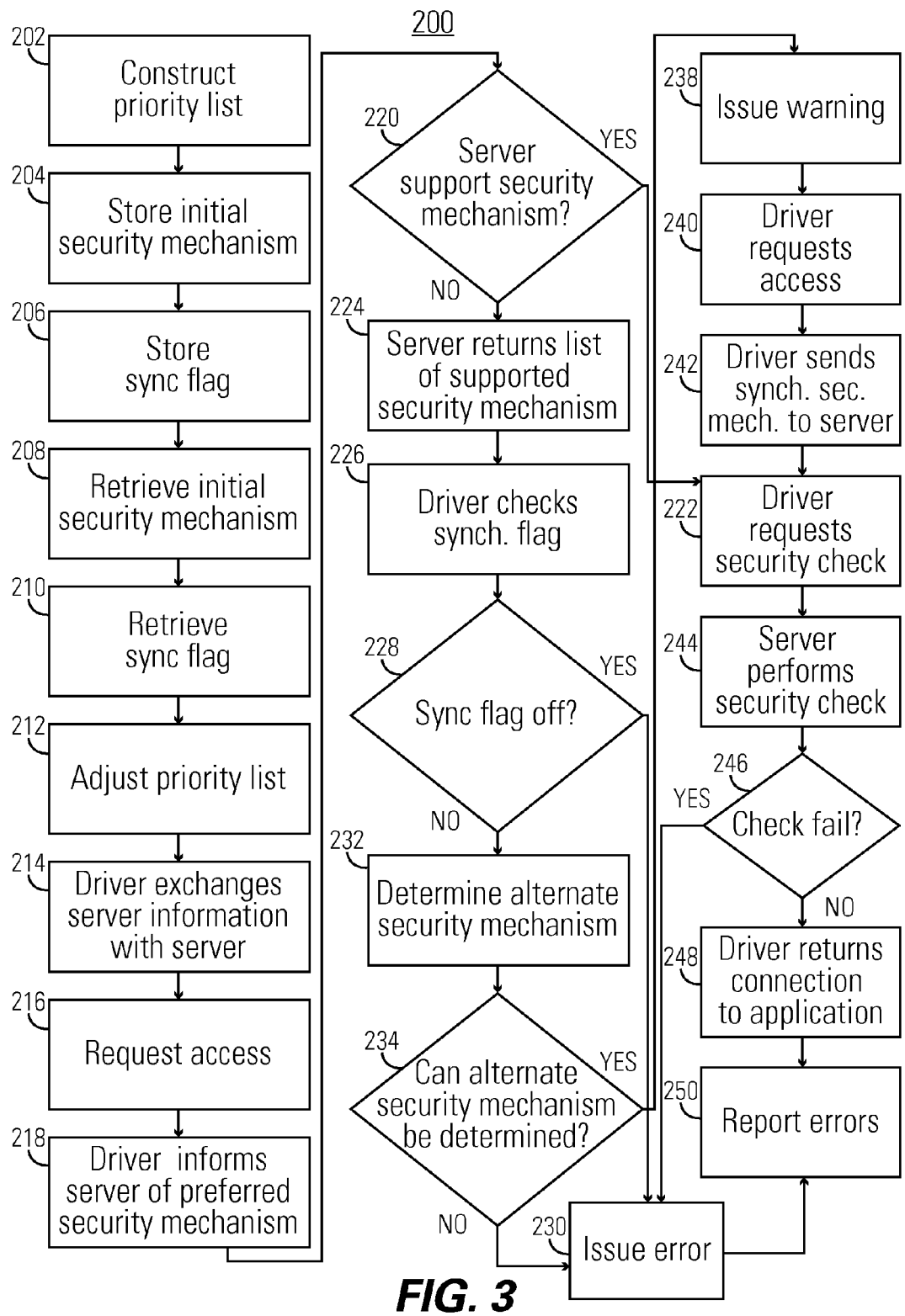
FIG. 3 shows a flow chart of a method of automatically synchronizing security mechanisms between database servers and database drivers.

FIG. 3 shows a flow chart of a method of automatically synchronizing security mechanisms between database servers and database drivers. In the following discussion this method will be discussed in connection with the hardware embodiment shown in FIGS. 1 and 2. However, it will be appreciated that the method of the invention may be adapted to other embodiments. A synchronization process 200 begins with the database driver 106 constructing a priority list with priority assigned to each security mechanism based on its secureness relative to the others, as shown in step 202. Priority may also be assigned using other factors, for example, by using a priori knowledge of security mechanisms likely to be encountered.

In step 204 the application 104 stores the initial security mechanism using the initial security mechanism interface 114. The application 104 stores the synchronization flag in step 206 in order to instruct the database driver 106 whether to synchronize the security mechanism with the database server 108 or not using the synchronization flag and corresponding interface 112. The database driver 106 retrieves the initial security mechanism that the application 104 stores using the initial security mechanism interface 114 in step 208. The database driver 106 retrieves the synchronization flag using the synchronization flag and corresponding interface 112 in step 210.

In step 212 the application 104 adjusts the priority list 118 for any user-defined security mechanism using the priority definition interface 116. The database driver 106 exchanges server information with the database server 108 in step 214. The database driver 106 requests security data access to the database server 108 in step 216. In step 218 the database driver 106 informs the database server 108 the initial security mechanism the application 104 prefers. If the database server 108 supports the initial security mechanism, as determined by step 220, the process 200 moves to step 222 where the database driver 106 requests a security check from the database server 108. Otherwise, in step 224 the database server 108 returns the list of supported security mechanisms.

The database driver 106 checks the synchronization flag in step 226. If the synchronization flag is turned off, it means that the application has indicated that the database driver should not synchronize the security mechanism with the database server 108, and an error is issued in step 230. In step 232 the database driver 106 compares the supported security mechanism list against the priority list to determine an alternative security mechanism. If an alternative security mechanism cannot be determined, an error is issued at step 230.

If an alternative security mechanism can be determined, the database driver issues a warning to indicate that the security mechanism has been synchronized with server in step 238. In step 240 the database driver 106 requests security data access to the database server again. In step 242 the database driver 106 sends the synchronized security mechanism to the database server 108.

The database driver 106 requests a security check from the database server 108 in step 222. The database server 108 performs a security check in step 244. If security check fails, as determined by step 246, an error is issued in step 230. If the security check does not fail, in step 248 the database driver 106 returns the connection to the application 104. Step 250 reports any errors.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
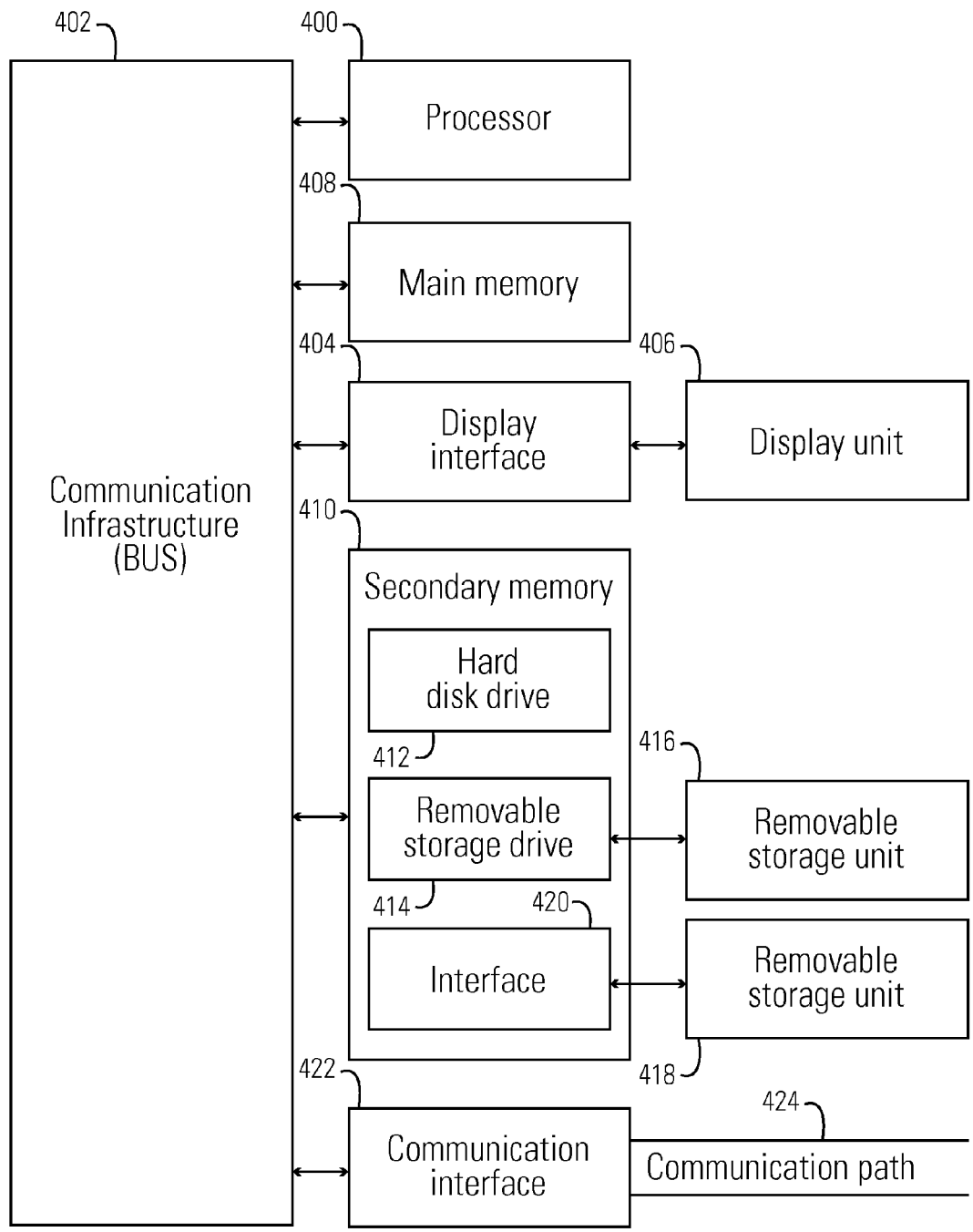
FIG. 4 is a high level block diagram showing an information processing system useful for implementing one embodiment of the present invention.

FIG. 4 is a high level block diagram showing an information processing system useful for implementing one embodiment of the present invention. The computer system includes one or more processors, such as processor 400. The processor 400 is connected to a communication infrastructure 402 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 404 that forwards graphics, text, and other data from the communication infrastructure 402 (or from a frame buffer not shown) for display on the display unit 406. The computer system also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 416 in a manner well known to those having ordinary skill in the art. Removable storage unit 416, represents a floppy disk, a compact disc, magnetic tape, optical disk, etc. which is read by and written to by removable storage drive 414. As will be appreciated, the removable storage unit 416 includes a computer readable medium having stored therein computer software and/or data.

In alternative embodiments, the secondary memory 410 may include other similar means for allowing computer programs or other instructions to be loaded into the computer system. Such means may include, for example, a removable storage unit 418 and an interface 420. Examples of such may include a program cartridge and cartridge interface (such as that found in video game devices), a removable memory chip (such as an EPROM, or PROM) and associated socket, and other removable storage units 418 and interfaces 420 which allow software and data to be transferred from the removable storage unit 418 to the computer system.

The computer system may also include a communications interface 422. Communications interface 422 allows software and data to be transferred between the computer system and external devices. Examples of communications interface 422 may include a modem, a network interface (such as an Ethernet card), a communications port, a PCMCIA slot and card, etc. Software and data transferred via communications interface 422 are in the form of signals which may be, for example, electronic, electromagnetic, optical, or other signals capable of being received by communications interface 422. These signals are provided to communications interface 422 via a communications path (i.e., channel) 424. This channel 424 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 408 and secondary memory 410, removable storage drive 414, a hard disk installed in hard disk drive 412, and signals.

Computer programs (also called computer control logic) are stored in main memory 408 and/or secondary memory 410. Computer programs may also be received via communications interface 422. Such computer programs, when executed, enable the computer system to perform the features of the present invention as discussed herein. In particular, the computer programs, when executed, enable the processor 400 to perform the features of the computer system. Accordingly, such computer programs represent controllers of the computer system.

In accordance with the present invention, we have disclosed systems and methods for synchronizing security mechanisms in database drivers with database servers. Those of ordinary skill in the art will appreciate that the teachings contained herein can be implemented using many kinds of software and operating systems. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A database security method comprising:
   requesting, by an application executing on a computer, access to a database server using a primary security mechanism;
   receiving a response from a database server that the primary security mechanism is not supported, the response comprising a plurality of alternative security mechanisms;
   receiving, on the computer, via a database driver, multiple choices of said plurality of alternative security mechanisms supported by the database server, the database driver configured to enable access to a database;
   determining that a synchronization flag is set;
   responsive to determining that the synchronization flag is set performing:
   selecting, at the computer, a security mechanism from the multiple choices of said plurality of alternative security mechanisms supported by the database server using said database driver; and
   automatically synchronizing security mechanisms between the application and the database server using said selected security mechanism; and responsive to determining that the synchronization flag is not set, returning an error.

2. The database security method of claim 1 wherein said database driver constructs a priority list of security mechanisms.

3. The database security method of claim 2 wherein said priority list prioritizes security mechanisms based on a measure of security of said security mechanisms.

4. The database security method of claim 2 wherein said selecting comprises selecting a security mechanism using said priority list.

5. The database security method of claim 1 further comprising storing the synchronization flag in the application.

6. A database security method comprising:
   constructing a priority list;
   storing a synchronization flag in an application, said flag instructing a database driver to synchronize a security mechanism with a database server or not;
   retrieving, at a computer, an initial security mechanism from the application;
   exchanging information between said database server and said database driver;
   requesting, at the computer, secure data access to a database controlled by said database server;
   informing said database server of said initial security mechanism;
   determining, at the computer, if said database server supports said initial security mechanism;
   responsive to determining that the initial security mechanism is not supported, determining that a synchronization flag is set;
   responsive to determining that the synchronization flag is set performing:
   determining, at the computer, an alternative security mechanism;
   automatically synchronizing the alternative security mechanism, with the application;
   sending said alternative synchronized security mechanism to said database server;
   conducting, at the computer, a security check; and
   connecting said database server to said application if said security check is passed; and
   responsive to determining that the synchronization flag is not set, returning an error.

7. The database security method of claim 6 wherein said requesting, sending and connecting are performed by said database driver.

8. The database security method of claim 6 wherein said conducting is performed by said database server.

9. The database security method of claim 6 wherein said determining an alternative security mechanism comprises using said priority list to make said determination.

10. The database security method of claim 6 further comprising adjusting said priority list based on a user-defined security mechanism.

11. A system comprising:
    a hardware processor;
    a synchronization flag interface, executing on the hardware processor, the synchronization flag interface for storing and retrieving a synchronization flag;
    an initial security mechanism interface for storing and retrieving an initial security mechanism;
    an alternative security mechanism interface for storing and retrieving an alternative security mechanism;
    a priority definition interface for defining priorities of alternative security mechanisms; and
    a priority list containing said defined priorities of said alternative security mechanisms;
    the system performing:
    requesting, access to a database server using said initial security mechanism;
    receiving a response from said database server that said initial security mechanism is not supported, the response comprising a plurality of said alternative security mechanisms;
    receiving, via a database driver, multiple choices of said alternative security mechanisms supported by the database server, the database driver configured to enable access to a database;
    determining that the synchronization flag is set;
    responsive to determining that the synchronization flag is set performing:
    selecting a security mechanism from the multiple choices of said alternative security mechanisms supported by the database server using said database driver; and
    automatically synchronizing security mechanisms between the system and the database server using said selected security mechanism; and
    responsive to determining that the synchronization flag is not set, returning an error.

12. The system of claim 11 wherein said synchronization flag is stored in a client application before it is retrieved by said synchronization flag interface.

13. The system of claim 11 wherein said initial security mechanism is stored in a client application before it is retrieved by said initial security mechanism interface.

14. The system of claim 11 wherein said security mechanism is a user-defined security mechanism.

15. The system of claim 11 wherein said priorities are defined based on a secureness of security mechanisms.

16. A computer program product comprising a non-transitory computer usable storage medium storing a computer readable program, wherein the computer readable program when executed on a computer performs:
    determining if a database server supports an initial security mechanism;
    responsive to determining that the initial security mechanism is not supported, determining that a synchronization flag is set in an application;

responsive to determining that the synchronization flag is set further performing:

providing, via a database driver, multiple choices of security mechanisms supported by a database server, said database driver enabling access to a database;

selecting a security mechanism from the multiple choices of security mechanisms supported by the database server using said database driver; and automatically synchronizing security mechanisms between the application and the database server using said selected security mechanism; and responsive to determining that the synchronization flag is not set, returning an error.

17. The computer program product of claim 16 wherein said computer readable program when executed on the computer further performing storing the synchronization flag in the application.

18. The computer program product of claim 16 wherein said computer readable program when executed on the computer further performing constructing a priority list of security mechanisms.

19. The computer program product of claim 18 wherein said computer readable program when executed on the computer further performing using said priority list to make said selection.

20. The computer program product of claim 18 wherein said computer readable program when executed on the computer further performing:

determining an alternative security mechanism; and use said priority list to make said determination.

* * * * *